(12) United States Patent
Fukagawa et al.

(10) Patent No.: US 6,207,321 B1
(45) Date of Patent: Mar. 27, 2001

(54) SODIUM SECONDARY BATTERY

(75) Inventors: Masayuki Fukagawa, Tokyo; Keiichi Iwamoto; Nozomu Kawasetsu, both of Nagasaki; Katsuzou Sudou, Nagoya; Akihiro Sawata, Yokohama, all of (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/154,275

(22) Filed: Sep. 16, 1998

(30) Foreign Application Priority Data

Sep. 16, 1997 (JP) ................................................. 9-250339
Mar. 19, 1998 (JP) ................................................. 10-069651

(51) Int. Cl.[7] ............................... H01M 2/02; H01M 2/04
(52) U.S. Cl. ......................... 429/176; 429/175; 429/165; 429/185
(58) Field of Search ..................................... 429/130, 151, 429/163, 165, 176, 175, 164, 168, 208, 185, 186

(56) References Cited

U.S. PATENT DOCUMENTS

| | | | |
|---|---|---|---|
| 687,121 | * | 11/1901 | Callender . |
| 4,049,889 | * | 9/1977 | Heintz .................................. 429/174 |
| 4,164,608 | * | 8/1979 | Coetzer .................................. 429/50 |
| 4,209,573 | * | 6/1980 | Chatterji et al. ..................... 429/104 |
| 5,006,424 | * | 4/1991 | Evans et al. ........................... 429/15 |

* cited by examiner

Primary Examiner—Carol Chaney
Assistant Examiner—Tracy Dove

(57) ABSTRACT

A sodium secondary battery which assures excellent sealing and can be manufactured in a simple manner is provided. The battery includes a negative electrode chamber defined by the inside of a bottom-closed, hollow cylindrical, solid electrolyte accommodated in an outer case and a positive electrode chamber formed outside the solid electrolyte and containing a porous electrode 4 impregnated with sulfur which serves as a positive electrode active substance. A cover, which closes the opening portion of the outer case, is fastened to the outer case by use of bolts and the interposition of an insulator.

15 Claims, 9 Drawing Sheets

SODIUM SECONDARY BATTERY

BACKGROUND OF THE INVENTION

1. Field of the Invention

The present invention relates to a sodium secondary battery which is sealed in an improved manner, and in particular to a rechargeable secondary battery applied to batteries for storage of electric power for road grading and to electric vehicles.

2. Background Art

FIG. 9 (PRIOR ART) is a schematic illustration of a conventional sodium secondary battery.

As shown in FIG. 9, in the conventional sodium secondary battery, a negative electrode chamber is formed by placing sodium 3 into a bottom-closed, hollow cylindrical solid electrolyte 2 provided inside an outer case 1; and between the outer case 1 and the solid electrolyte 2 is disposed a porous electrode 4 impregnated with sulfur 5 serving as a positive electrode active substance, to thereby form a positive electrode chamber. An outer case metal fitting 6 having an L-shaped cross section is welded to the opening portion of the outer case 1. For a cover 12, a metal fitting (hereinafter referred to as a cover metal fitting 8) is provided. An electric insulator 7, attached along the outer periphery of the solid electrolyte 2 in the vicinity of its opening, is sandwiched between the outer case metal fitting 6 and the cover metal fitting 8 via an aluminum alloy 9 serving as a brazing material, and undergoes hot-pressing to thereby provide sealing of the structure.

With the above structure, in the discharge process the sodium 3 contained in the negative electrode chamber dissociates into sodium ions and electrons. The sodium ions pass through the solid electrolyte 2 to migrate into the positive electrode chamber outside the solid electrolyte and are combined with the sulfur 5 and electrons circulating outside the cell to thereby form sodium polysulfide.

Meanwhile, in the charge process, sodium polysulfide present in the positive electrode chamber dissociates into sodium ions, electrons, and sulfur. The formed sodium ions pass through the solid electrolyte 2 to migrate into the negative electrode chamber defined by the inside of the tubular solid electrolyte and are combined with electrons circulating outside the cell to thereby form sodium 3.

The process for manufacturing the above cell will next be described.

(1) The insulator 7 is bonded to the upper portion of the bottom-closed, tubular solid electrolyte 2 by use of a glass solder 10.

(2) The upper face of the insulator 7 is bonded to the cover metal fitting 8, and the lower part of the insulator 7 is bonded to the outer case metal fitting 6, both by hot-press bonding by the mediation of aluminum alloy 9 serving as a brazing material. As used herein, the term "hot-press bonding" refers to bonding between heterogeneous materials by the application of pressure in an atmosphere of about 600° C., which is close to the melting point of aluminum alloy 9.

(3) The positive electrode 4 impregnated with the sulfur 5 serving as a positive electrode active substance is placed in the outer case 1, and then the outer case metal fitting 6 is welded to the outer case 1.

(4) A wick 11, which also serves as a safety tube and has a sodium discharge outlet 11a, is secured onto the cover 12, which is then welded with the cover metal fitting 8.

(5) The sodium 3, in the form of liquid, is injected from a sodium-injection-hole, and the hole is sealed with a sealing member 13.

Problems that arise in relation to hot-press bonding for manufacturing the sodium secondary battery will next be described.

(1) A high temperature is required for melting the aluminum alloy 9 serving as a brazing material; thus, a heating apparatus, such as an electric furnace achieving a temperature as high as approximately 600° C., is required. A vacuum condition may also be required, depending on the bonding method employed.

(2) Under the aforementioned conditions (i.e., high temperature and in vacuo), pressurization must be performed, which raises disadvantages associated with scaling up of the apparatus employed and an increase in the number of manufacturing steps, such as cooling from high temperatures and raising pressure from the vacuum condition to atmospheric pressure.

(3) There may be a case in which β-alumina, serving as an insulator, breaks due to high temperature. The breakage induces reaction between sodium and sulfur to suddenly cause a high temperature condition. When the temperature is higher than the melting point of aluminum, the cell is broken.

(4) Conventional planar-type sodium secondary batteries suffer a problem of poor sealing caused by a large proportion of hot-press-welded parts since flanges located at the periphery of a positive electrode container and a negative electrode container being opposite to each other are hot-press welded.

SUMMARY OF THE INVENTION

The present invention was accomplished in order to solve the problems remaining in the conventional techniques, and an object of the present invention is to provide a rechargeable secondary battery applied to batteries for storage of electric power for road-grading and to electric vehicles.

To solve the above-described problems, in a first aspect of the present invention, there is provided a sodium secondary battery in which a negative electrode chamber is formed inside a bottom-closed, hollow cylindrical, solid electrolyte, which is accommodated in an outer case, and a positive electrode chamber is formed outside the solid electrolyte, wherein a cover which closes the opening of the outer case is fastened to the outer case by bolts and the interposition of an insulator.

According to the first aspect of the invention, the following four advantages are obtained, since the cover, which closes the opening of the outer case, is sealed by the bolts and the interposition of an insulator.

i) A secondary battery can be manufactured without thermal stress being generated and with remarkably increased yield;

ii) An electric furnace is eliminated from the manufacturing facility, whereby the time for heating in the electric furnace is saved, a cooling step may be omitted, manufacture is simplified, and the facility cost is reduced remarkably.

iii) Since the solid electrolyte 2 will not be broken, possibility of disintegration of the brazed members is reduced even when the temperature of the brazed portion becomes higher than the melting point of aluminum as a result of reaction between sodium and sulfur; and iv) The battery is easily disassembled by simple loosening of the bolts, to thereby facilitate recycling the battery, which is more difficult in the case of batteries fabricated through melt bonding.

In the above-described first aspect of the invention, preferably, the cover and the opening portion of the outer case of the sodium secondary battery are formed of a common material and the linear expansion coefficient thereof is greater than that of the insulator. This is advantageous in that more secure fastening with bolts is achieved to thereby provide improved sealing.

Preferably, a space is provided, at the opening portion of the outer case, to allow expansion of the bolts when the cell temperature rises to the operation temperature of the battery. This structure is advantageous in that need for washers is eliminated.

Preferably, the insulator also serves as a cover. With the employment of an insulator which also functions as a cover, the number of members is reduced to thereby simplify the structure of the casing. Preferably, the flanges are formed such that their bolt-receiving portions have an increased thickness to accommodate the expansion of the bolts when the cell temperature rises to the operation temperature of the battery. With this structure, use of washers is advantageously eliminated.

In a second aspect of the present invention, there is provided a sodium secondary battery in which a positive electrode chamber is formed inside a bottom-closed, hollow cylindrical, solid electrolyte, which is accommodated in an outer case, and a negative electrode chamber is formed outside the solid electrolyte, wherein a cover which closes the opening of the outer case is fastened to the outer case by bolts and the interposition of an insulator.

The second aspect of the invention permits manufacture of a sodium secondary battery, in which a positive electrode chamber is formed inside and a negative electrode chamber is formed outside without thermal stress being generated; remarkably increases yield; and eliminates the use of an electric furnace in the manufacturing process, whereby the time for heating in the electric furnace is saved, a cooling step may be omitted, manufacture is simplified, and the facility cost is reduced remarkably.

Preferably, the insulator according to the second aspect of the invention also serves as a cover. With the employment of an insulator, which also functions as a cover, the number of members is reduced to thereby simplify the structure of the casing.

In the third aspect of the present invention, a sodium secondary battery, in which a negative electrode chamber on one side is separated from a positive electrode chamber on the other side via a plate-like solid electrolyte, is provided; and a negative electrode container having an outwardly projecting flange and a positive electrode container having another outwardly projecting flange are located opposite to each other; wherein an insulator is provided along the periphery of the solid electrolyte, and the flange of the negative electrode container and the flange of the positive electrode chamber are fastened to each other by bolts and the interposition of the insulator therebetween.

With this structure according to the third aspect of the invention, the flanges can be fastened by the sole use of the bolts and, therefore, the level of sealing can be arbitrarily tuned by adjusting intervals between the bolts in the flanges, in contrast to the case of conventional plate-type sodium secondary batteries, which suffer problems attributed to poor sealing due to an enlarged area in which hot press bonding is performed relative to the area in which reaction of the solid electrolyte of the cell occurs. In this preferred feature of the present invention, more preferably, the cover and the opening portion of the outer case of the sodium secondary battery are formed of a common material and the linear expansion coefficient thereof is greater than that of the insulator. This achieves more secure fastening with the bolts, to thereby provide improved sealing. Preferably, the flanges are formed such that their bolt-receiving portions have an increased thickness to ensure the effect of tight fastening attributed to the difference in expansion between each bolt and its surrounding parts when the cell temperature rises to the operation temperature of the battery. With this structure, use of washers is advantageously eliminated.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION AND PREFERRED EMBODIMENTS

The present invention will next be described with reference to specific embodiments, which should not be construed as limiting the invention.

Embodiment 1

Figure 1:
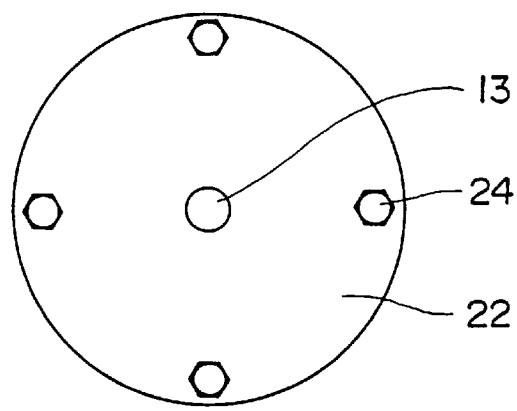
FIGS. 1A and 1B depict a schematic illustration of a secondary battery according to a first embodiment of the present invention.
Figure 1:
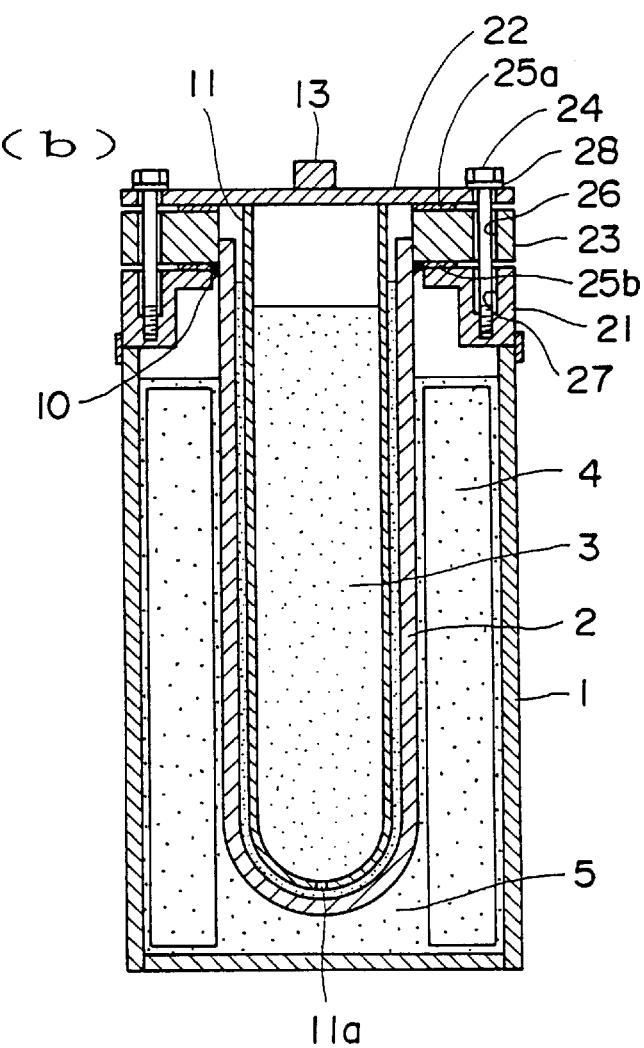

FIG. 1A and FIG. 1B are a schematic illustration of a sodium secondary battery according to a first embodiment of the present invention.

Figure 9:
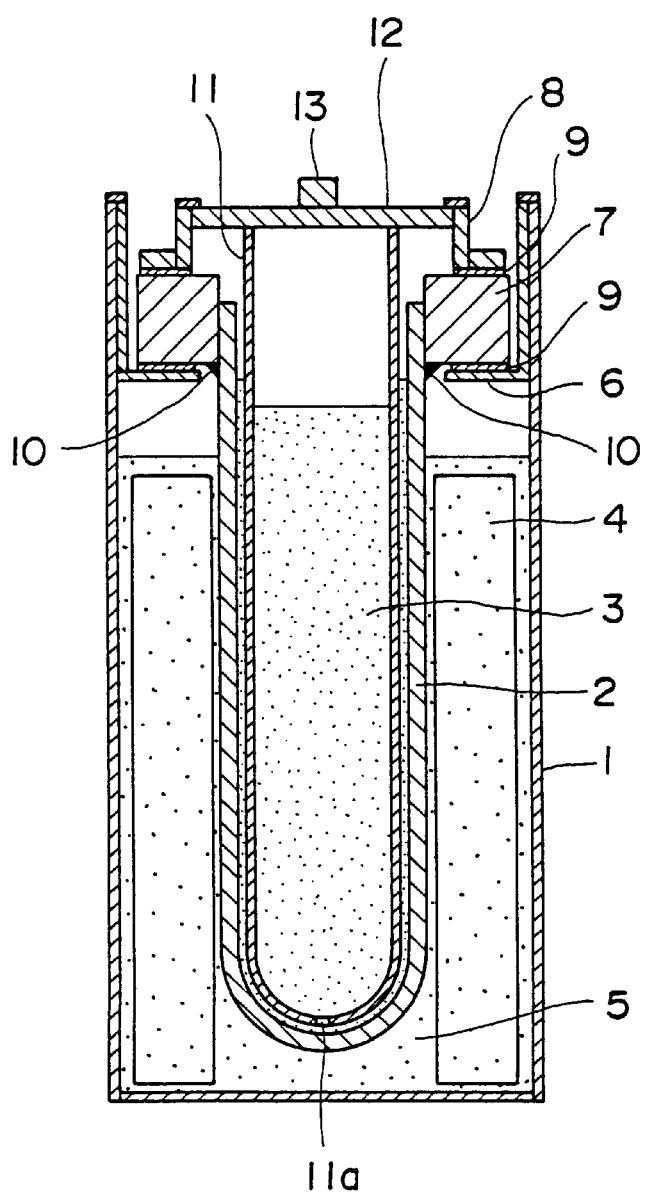
FIG. 9 is a schematic illustration of a conventional secondary battery.

As shown in FIG. 1A and FIG. 1B, the sodium secondary battery, according to the first embodiment of the present invention, has a structure the same per se as that of the conventional secondary battery, as shown in FIG. 9, but has an outer case sealed with a cover in a different manner to provide improved sealing of the battery.

The sodium secondary battery, according to the first embodiment of the present invention, has a negative electrode chamber formed by placing sodium 3 into a bottom-closed, hollow cylindrical solid electrolyte 2 provided inside an outer case 1. A positive electrode chamber, which houses a porous electrode 4 impregnated with sulfur 5, serving as a positive electrode active substance is provided, between the outer case 1 and the solid electrolyte 2. A cover 22, which closes an outer case metal fitting 21 provided for the opening portion of the outer case 1, is fastened by bolts 24 with the interposition of an insulator 23. Parts in FIG. 1A and FIG. 1B corresponding to the same parts shown in FIG. 9 are labeled with the same numerals, which are used without definitions, since the sodium secondary battery shown in FIG. 9 and that shown in FIG. 1A and FIG. 1B are basically identical to each other with the exception of the fastening structure for the cover.

Specifically, according to this embodiment, the cover 22 is fastened with the insulator 23 and the outer case metal fitting 21 by exclusive use of bolts 24. In this case, the thickness and linear expansion coefficient of each member are adjusted to maintain improved sealing of the battery even during operation at high temperature.

The outer case metal fitting 21 is provided along the periphery of the opening of the outer case 1 to be united therewith by welding; is formed of the same material as the cover 22; and has a linear expansion coefficient different from that of the insulator 23.

Figure 2:
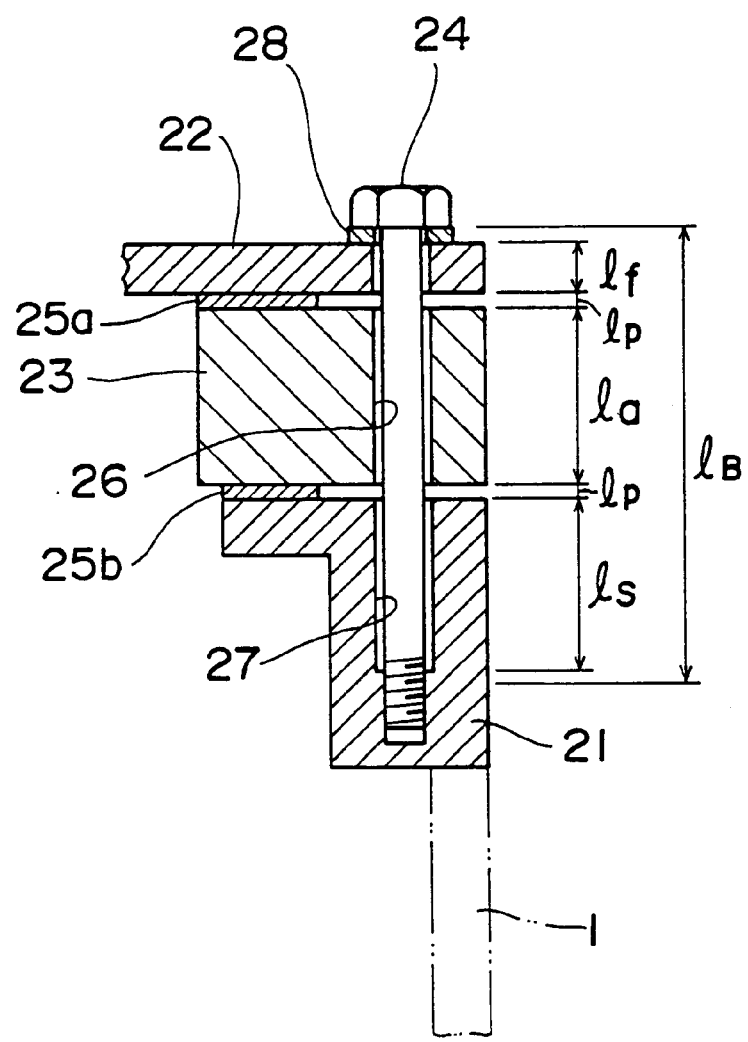
FIG. 2 is an enlarged illustration of a fastening portion of the battery shown in FIG. 1.

FIG. 2 is an enlarged illustration of a fastening portion of the above structure.

As shown in FIG. 2, the insulator 23 is bonded on its lower side with the outer case metal fitting 21 and on its upper side with the bolt 24, via aluminum packings 25a and 25b, respectively. A space 26 and a space 27 are provided between the bolt 24 and each of the cover 22, the insulator 23, and the outer case metal fitting 21.

The space 26 is provided so that the bolt 24 made of metal and the insulator 23 made of, for example, α-alumina, do not interfere with each other, which would otherwise occur, for example, in such a case where the two members having different expansion coefficients expand differently due to the material difference. The space 27, provided between each of the cover 22 and the outer case metal fitting 21 and the bolt 24, is provided to ensure the effect attributed to the difference in linear expansion coefficient between the bolt 24 and the cover 22 or metal fitting 21, when the cell temperature rises as high as the operation temperature of the battery (e.g., about 320° C.).

In fastening by the bolts, the bolt 24 is tightened making use of difference in linear expansion coefficients of the materials and the accompanying difference in expansion generated during the temperature change from ambient temperature to high temperature; thus, only insulating washers 28 are required, eliminating the necessity of generally-used washers which compensate expansion of bolts.

The material, length or thickness, and linear expansion coefficient of each material used in the present embodiment are shown in the following Table 1.

TABLE 1

| | Material | Length, thickness [mm] | Linear expansion coeff. (l) /° C. |
|---|---|---|---|
| Bolt | SCM 435 | $l_B = 23$ | $(11 - 12) \times 10^{-6}$ |
| Cover | SUS 304 | $l_f = 3$ | $(17 - 18) \times 10^{-6}$ |
| Packing | Al | $l_p = 1$ | $(23 - 24) \times 10^{-6}$ |
| Insulator | α-alumina | $l_a = 10$ | $(7.5 - 8.5) \times 10^{-6}$ |
| Packing | Al | $l_p = 1$ | $(23 - 24) \times 10^{-6}$ |
| Outer case metal fitting | SUS 304 | $l_s = 10$ | $(17 - 18) \times 10^{-6}$ |

Linear expansion from ambient temperature (20° C.) to the operation temperature (320° C.) of the bolt and that of the surrounding parts are determined for the materials shown in Table 1.

(1) Expansion of the bolt $24 = 23 \times 11.5 \times 10^{-6}33 (320-20) = 0.0794$ [mm]

(2) Expansion of {cover (22), packing (25a), insulator (α-alumina) (23), packing (25b), outer case metal fitting (21)} = $\{3 \times 17.5 \times 10^{-6} + 1 \times 23.5 \times 10^{-6} + 10 \times 8.0 \times 10^{-6} + 1 \times 23.5 \times 10^{-6} + 10 \times 17.5 \times 10^{-6}\} \times (320-20) = 0.1064$ [mm]

The results show that the expansion of (2) is greater than the expansion of (1), indicating that the bolt is tightened as the temperature rises from ambient temperature to the operation temperature, to thereby provide improved sealing.

Specifically, selection of materials which satisfy the relationship, [expansion of the bolt]≦[expansion of the cover+expansion of the insulator (α-alumina)+expansion of the outer case metal fitting+expansion of the aluminum packings], enables excellent sealing of the battery to be maintained at high temperature during operation.

Fastening of the present embodiment provides the following advantages as compared with that achieved by a conventional technique.

i) A secondary battery can be manufactured without thermal stress being generated and with remarkably increased yield.

ii) An electric furnace is eliminated from the manufacturing facility, whereby the time for heating in the electric furnace is saved, a cooling step may be omitted, manufacture is simplified, and the facility cost is reduced remarkably.

iii) Since the solid electrolyte 2 will not be broken, possibility of disintegration of the bonded members is reduced even if the temperature of the bonded portion becomes higher than the melting point of aluminum as a result of reaction between sodium and sulfur; and iv) The battery is easily disassembled by simply loosening the bolts, to thereby facilitate recycling of the battery, which is more difficult in the case of batteries fabricated through melt bonding.

Embodiment 2

Figure 3:
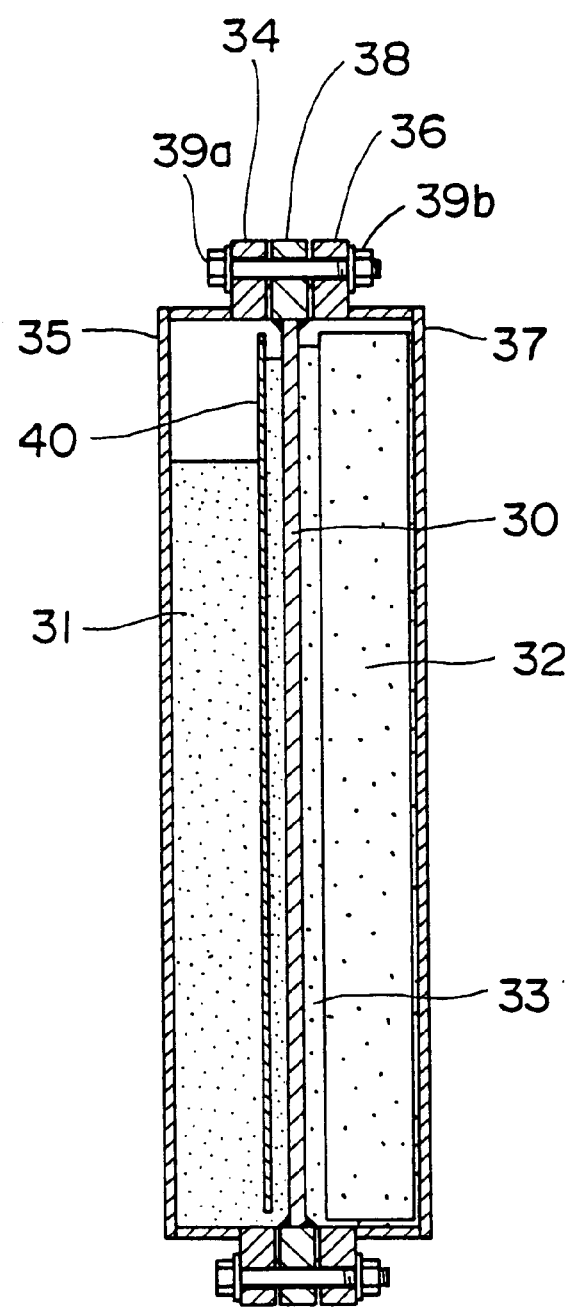
FIG. 3 is a schematic illustration of a secondary battery according to a second embodiment of the present invention.

FIG. 3 is a schematic illustration of a plate-type sodium secondary battery according to a second embodiment of the present invention.

As shown in FIG. 3, the sodium secondary battery, according to the second embodiment of the present invention, includes a negative electrode chamber in which sodium 31 is placed, a positive electrode chamber which houses a porous electrode 32 impregnated with sulfur 33, and a plate-like solid electrolyte 30 interposed therebetween. The negative electrode chamber is defined by a negative electrode container 35 having an outwardly projecting flange 34 and the positive electrode chamber is defined by a positive electrode container 37 having an outwardly projecting flange 36, and the negative and positive electrode containers 35 and 37 are located opposite to each other with respect to the solid electrolyte 30. An insulator 38 is provided along the periphery of the solid electrolyte 30, and the outwardly projecting flange 34 of the negative electrode and the outwardly projecting flange 35 of the positive electrode chamber are fastened by bolts 39a and nuts 39b. In FIG. 3, numeral 40 indicates a wick which also serves as a safety tube.

In the second embodiment, the outwardly projecting flange 34 of the negative electrode, the insulator 38, and the outwardly projecting flange 35 of the positive electrode are fastened by use of only bolts 39a and nuts 39b. In this case, the thickness and linear expansion coefficient of each member are adjusted to maintain improved sealing of the battery even during operation at high temperature.

In the second embodiment, the outwardly projecting flange 34 of the negative electrode and the outwardly projecting flange 36 of the positive electrode are formed of a common material and have a linear expansion coefficient different from that of the insulator 38.

Figure 4:
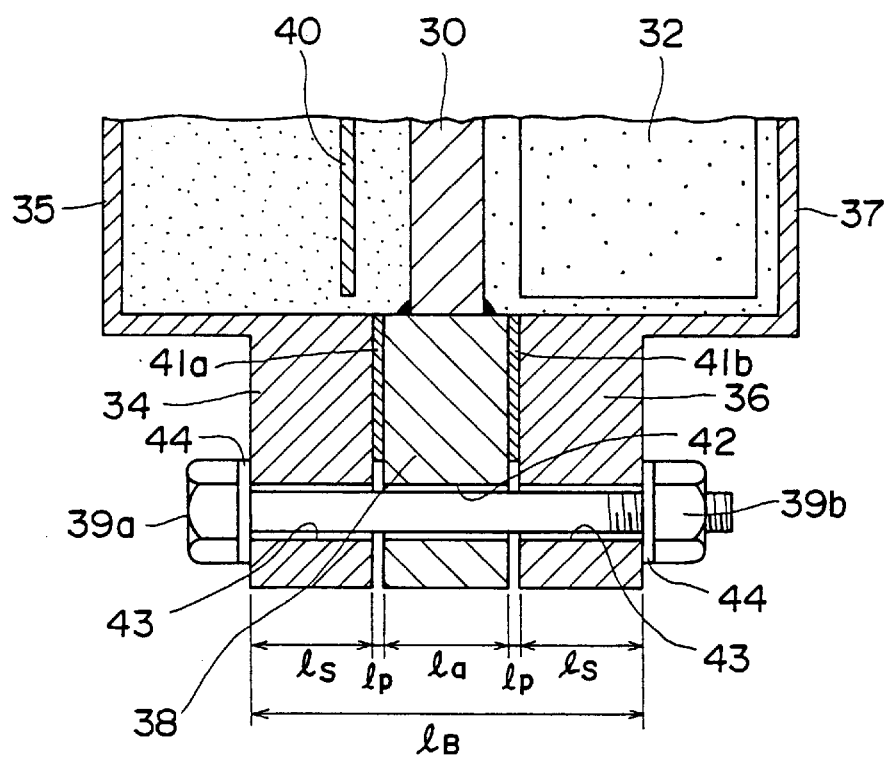
FIG. 4 is a partial, enlarged illustration of the fastening portion of the battery shown in FIG. 3.

FIG. 4 is an enlarged illustration of a fastening portion of the above structure.

As shown in FIG. 4, the insulator 38 is secured on one side to the outwardly projecting flange 34 of the negative electrode and on the other side to the outwardly projecting flange 36 of the positive electrode by the bolt 39a and the nut 39b and via an aluminum packing 41a and an aluminum packing 41b. A space 42 and a space 43 are provided between the bolt 39a and each of the outwardly projecting flange 34 of the negative electrode, the outwardly projecting flange 36 of the positive electrode, and the insulator 38.

The space 42 is provided so that the bolt 39a made of metal and the insulator 39 made of, for example, α-alumina, do not interfere with each other, which would otherwise occur, for example, in such a case where the two members having different expansion coefficients expand differently due to the material difference. The space 43, provided between the bolt 39a and each of the outwardly projecting flange 34 for the negative electrode and the outwardly projecting flange 36 for the positive electrode, ensures the effect of tight fastening owing to the difference in linear expansion coefficient between the bolt 39a and its surrounding parts even under high temperature conditions.

Figure 5:
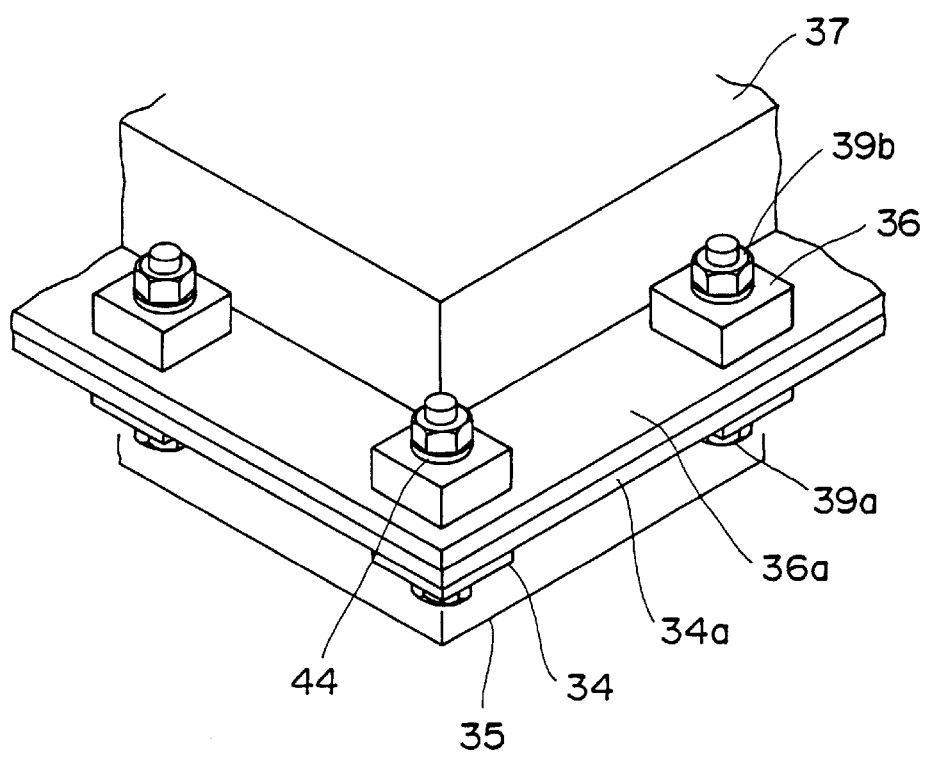
FIG. 5 is a perspective view of the secondary battery according to the second embodiment of the present invention.
Figure 6:
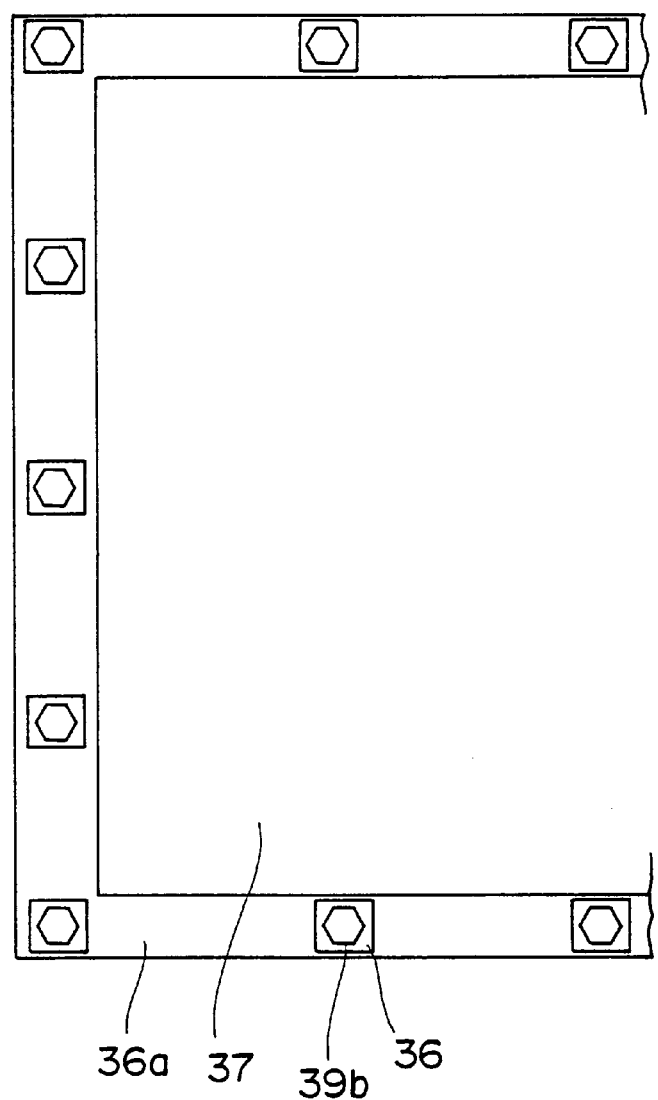
FIG. 6 is a plan view of the secondary battery according to the second embodiment of the present invention.

As shown in the perspective view of FIG. 5, in the present embodiment, the outwardly projecting flange 34 of the negative electrode and the outwardly projecting flange 36 of the positive electrode are thicker than flanges 34a and 36a defining the remaining portions of peripherally-provided flanges to ensure the effect of tight fastening attributed to the difference in linear expansion coefficient between each bolt and its surrounding parts and the accompanying difference in expansion generated when the cell temperature rises to the operation temperature of the battery. FIG. 6 is a plan view of a plate-type sodium secondary battery.

In fastening by the bolts, only insulating washers 44 are used, thereby eliminating the necessity of generally-used washers which compensate expansion of bolts.

The material, length or thickness, and linear expansion coefficient of each material used in the present embodiment are shown in the following Table 2.

TABLE 2

| | Material | Length, thickness [mm] | Linear expansion coeff. (l) /° C. |
|---|---|---|---|
| Bolt | SCM 435 | $l_B = 30$ | $(11 - 12) \times 10^{-6}$ |
| Negative electrode flange | SUS 304 | $l_s = 10$ | $(17 - 18) \times 10^{-6}$ |
| Packing | Al | $l_p = 1$ | $(23 - 24) \times 10^{-6}$ |
| Insulator | α-alumina | $l_a = 10$ | $(7.5 - 8.5) \times 10^{-6}$ |
| Packing | Al | $l_p = 1$ | $(23 - 24) \times 10^{-6}$ |
| Positive electrode flange | SUS 304 | $l_s = 10$ | $(17 - 18) \times 10^{-6}$ |

Linear expansion from ambient temperature (20° C.) to the operation temperature (320° C.) of the bolt and that of the surrounding parts are determined for the materials shown in Table 2.

(1) Expansion of the bolt $(39) = 30 \times 11.5 \times 10^{-6} \times (320-20) = 0.1035$ [mm]

(2) Expansion of (positive electrode flange (thick portion) (34), aluminum packing (41a), insulator (α-alumina) (38), aluminum packing (41b), positive electrode flange (thick portion) (36) } = {$10 \times 18 \times 10^{-6} + 1 \times 23.5 \times 10^{-6} + 10 \times 7.4 \times 10^{-6} + 1 \times 23.5 \times 10^{-6} + 10 \times 18 \times 10^{-6}$} $\times (320-20) = 0.1443$ [mm]

The results show that the expansion of (2) is greater than the expansion of (1), indicating that the bolt is tightened as the temperature rises from ambient temperature to the operation temperature, to thereby provide improved sealing.

Thus, selection of materials which satisfy the relationship, [expansion of the bolt]≦[expansion of the negative electrode flange+expansion of the insulator (α-alumina)+expansion of the positive electrode flange+expansion of the aluminum packing], enables excellent sealing of the battery to be maintained at high temperature during operation.

In addition to the previously-described advantages i) to iv) acknowledged in relation to the case of the hollow-cylindrical type battery, fastening of the second embodiment further provides the following advantages as compared with that by a conventional technique:

v) The flanges can be fastened by use of only bolts and nuts, and therefore, can be arbitrarily tuned by adjusting intervals between bolts in the flanges, in contrast to the case of conventional plate-type sodium secondary batteries, which suffer problems attributed to poor sealing due to an enlarged area in which hot press bonding is performed relative to the area in which reaction of the solid electrolyte of the cell occurs.

Embodiment 3

Figure 7:
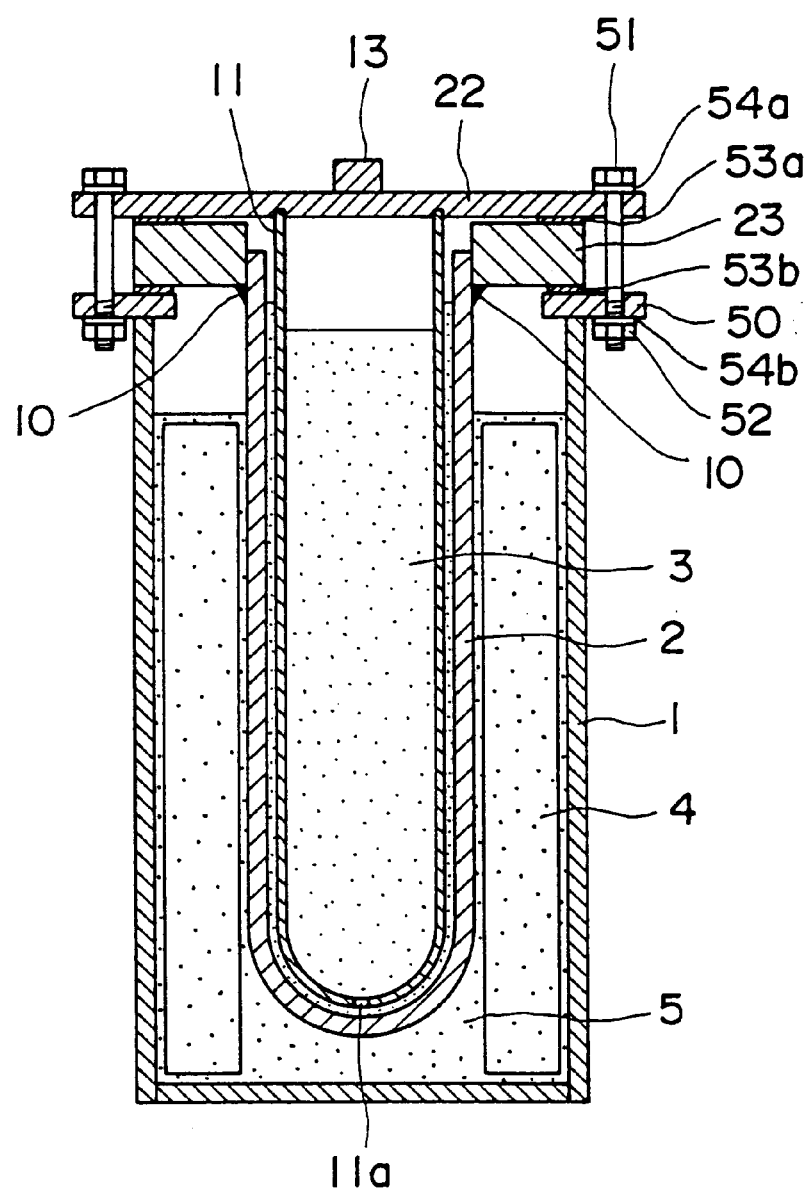
FIG. 7 is a schematic illustration of a secondary battery according to a third embodiment of the present invention.

FIG. 7 is a schematic illustration of a sodium secondary battery according to a third embodiment of the present invention.

As shown in FIG. 7, the sodium secondary battery, according to the third embodiment, has a battery structure the same per se as that shown in FIG. 1A and FIG. 1B, but provides improved sealing due to the employment of a different fastening manner of a cover and a case. Briefly, an outer case 1 is fastened to a cover 22 by bolts and nuts, with the bolts being arranged so as not to penetrate an insulator, to thereby provide improved sealing.

The sodium secondary battery according to the third embodiment has a negative electrode chamber formed by placing sodium 3 into a bottom-closed, hollow cylindrical solid electrolyte 2 provided inside an outer case 1. A positive electrode chamber, which houses a porous electrode 4 impregnated with sulfur 5 serving as a positive electrode active substance is provided between the outer case 1 and the solid electrolyte 2. A cover 22 is fastened to an outer case flange 50, provided along the periphery of the opening of the case, by the bolts 51 and nuts 52 and the interposition of an insulator 23. Parts in FIG. 1A and FIG. 1B corresponding to the same parts shown in FIG. 7 are labeled with the same numerals, which are used without definitions, since the sodium secondary battery shown in FIG. 7 and that shown in FIG. 1A and FIG. 1B are basically identical to each other with the exception of the sealing structure for the cover.

Specifically, according to the third embodiment, unification of the cover 22, the insulator 23, and the outer case flange 50 is conducted by the bolts 50 and nuts 51. This embodiment differs from the case of the first embodiment in that fastening of the cover is performed without penetration of the bolts through the insulator 23. When fastening is performed, aluminum packings 53a and 53b are used, and the thickness and linear expansion coefficient of each member are adjusted to maintain improved sealing of the battery even during operation at high temperature.

In the third embodiment, the outer case flange 50 is integrally provided at the opening of the outer case 1 by welding; is formed of the same material as the cover 22; and has a linear expansion coefficient different from that of the insulator 23.

In fastening by the bolts 51 and nuts 52, the bolts 51 are tightened by making use of difference in the linear expansion coefficients of the materials and the accompanying difference in expansion generated during the temperature change from ambient temperature to high temperature; thus, only insulating washers 54a and 54b are used and generally-used washers which compensate expansion of bolts are not required.

The material, length or thickness, and linear expansion coefficient of each material used in the third embodiment are shown in the following Table 3.

TABLE 3

| | Material | Length, thickness [mm] | Linear expansion coeff. (l) /° C. |
|---|---|---|---|
| Bolt | SCM 435 | $l_B = 18$ | $(11 - 12) \times 10^{-6}$ |
| Cover | SUS 304 | $l_f = 3$ | $(17 - 18) \times 10^{-6}$ |
| Packing | Al | $l_p = 1$ | $(23 - 24) \times 10^{-6}$ |
| Insulator | α-alumina | $l_a = 10$ | $(7.5 - 8.5) \times 10^{-6}$ |
| Packing | Al | $l_p = 1$ | $(23 - 24) \times 10^{-6}$ |
| Outer case flange | SUS 304 | $l_s = 3$ | $(17 - 18) \times 10^{-6}$ |

Linear expansion from ambient temperature (20° C.) to the operation temperature (320° C.) of the bolt and that of the surrounding parts are determined for the materials shown in Table 3.

(1) Expansion of the bolt $(51) = 18 \times 11.5 \times 10^{-6} \times (320-20) = 0.0621$ [mm]

(2) Expansion of {cover (22), packing (53a), insulator (α-alumina) (23), packing (53b), outer case flange (50)} = $\{3 \times 17.5 \times 10^{-6} + 1 \times 23.5 \times 10^{-6} + 10 \times 8.0 \times 10^{-6} + 1 \times 23.5 \times 10^{-6} + 3 \times 17.5 \times 10^{-6}\} \times (320-20) = 0.0696$ [mm]

The results show that the expansion of (2) is greater than the expansion of (1), indicating that the bolts are tightened as the temperature rises from ambient temperature to the operation temperature, to thereby provide improved sealing.

Specifically, selection of materials which satisfy the relationship, [expansion of the bolt]≦[expansion of the cover+expansion of the insulator (α-alumina)+expansion of the outer case flange+expansion of the aluminum packings]; enables excellent sealing of the battery to be maintained at high temperature during operation.

In addition to the advantages obtained from the first embodiment, fastening of the present embodiment further provides the following advantage:

vi) Processing of the insulator is not necessary. Moreover, processing of the outer case metal fitting 21, shown in FIG. 1A and FIG. 1B, to be adapted to fastening with bolts is not necessary, and simple bolt-and-nut fastening provides high level of sealing through use of a simple structure.

Embodiment 4

Figure 8:
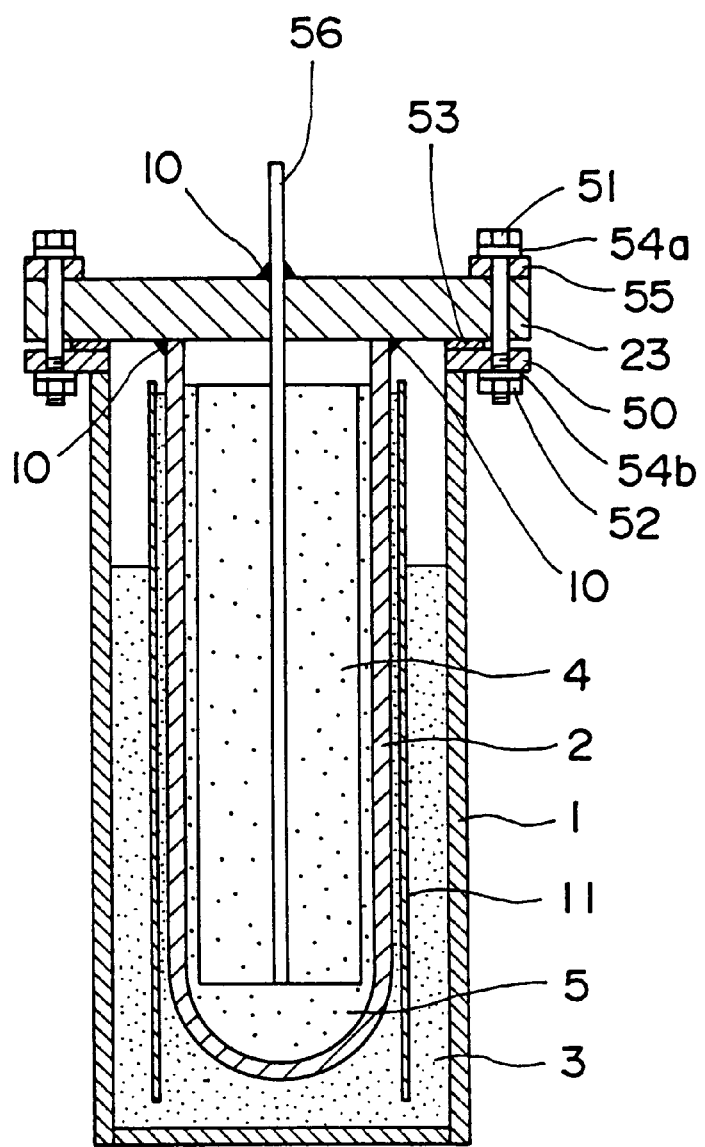
FIG. 8 is a schematic illustration of a secondary battery according to a fourth embodiment of the present invention.

FIG. 8 is a schematic illustration of a sodium secondary battery according to a fourth embodiment of the present invention.

As shown in FIG. 8, the sodium secondary battery, according to the fourth embodiment, differs from the battery of FIG. 7 in that, in the structure of the battery itself, sulfur 5 is contained inside the tubular solid electrolyte 2 and sodium 3 is disposed outside the solid electrolyte 2, and in that use of the cover 22 is eliminated, with the insulator 23 also serving as a cover.

The sodium secondary battery, according to the fourth embodiment, has a positive electrode chamber formed by placing sulfur 5 serving as a positive electrode active substance into a bottomed-closed, hollow cylindrical solid electrolyte 2, which is provided inside an outer case 1. A negative electrode chamber containing sodium 3 is provided between the outer case 1 and the solid electrolyte 2. An insulator 23, which also serves as a cover for closing the outer case 1 at its outer case flange 50 provided along the periphery of the opening of the outer case 1, is disposed to cover the upper opening of the solid electrolyte 2 and fastened by the bolts 51 and nuts 52. In FIG. 8, reference numeral 56 indicates an electricity-collecting rod.

Thus, fastening of the outer case flange 50 of the fourth embodiment to the insulator 23, which also serves as a cover, is performed by use of the bolts 50 and nuts 51. This embodiment differs from the case of the first embodiment in that the fastening is performed without penetrating the insulator 23 and without need of a cover as shown in FIG. 7.

When fastening is performed, an aluminum packing 53a and metal washers 55 are used, and the thickness and linear expansion coefficient of each member are adjusted to maintain improved sealing of the battery even during operation at high temperature.

In the fourth embodiment, the outer case flange 50 is integrally provided at the opening of the outer case 1 by welding, and has a linear expansion coefficient different from that of the insulator 23 which also serves as a cover.

In fastening by use of the bolts 51 and nuts 52, the bolts 51 are tightened by making use of difference in the linear expansion coefficients of the materials and the accompanying difference in expansion generated during the temperature change from ambient temperature to high temperature. Insulating washers 54a and 54b and a metal washer 55 provide further improved sealing.

The material, length or thickness, and linear expansion coefficient of each material used in the fourth embodiment are shown in the following Table 4.

TABLE 4

| | Material | Length, thickness [mm] | Linear expansion coeff. (l) /° C. |
|---|---|---|---|
| Bolt | SCM 435 | $l_B = 18$ | $(11 - 12) \times 10^{-6}$ |
| Washer | SUS 304 | $l_f = 3$ | $(17 - 18) \times 10^{-6}$ |
| Insulator | α-alumina | $l_a = 10$ | $(7.5 - 8.5) \times 10^{-6}$ |
| Packing | Al | $l_p = 1$ | $(23 - 24) \times 10^{-6}$ |
| Outer case flange | SUS 304 | $l_s = 3$ | $(17 - 18) \times 10^{-6}$ |

Linear expansion from ambient temperature (20° C.) to the operation temperature (320° C.) of the bolt and that of the surrounding parts inclusive are determined for the materials shown in Table 4.

(1) Expansion of the bolt $(51) = 17 \times 11.5 \times 10^{-6} \times (320-20) = 0.05865$ [mm]

(2) Expansion of {washer (55), insulator (α-alumina) (23), packing (53), outer case flange (50)} = $\{3 \times 17.5 \times 10^{-6} + 10 \times 8.0 \times 10^{-6} + 1 \times 23.5 \times 10^{-6} + 3 \times 17.5 \times 10^{-6}\} \times (320-20) = 0.0626$ [mm]

The results show that the expansion of (2) is greater than the expansion of (1), indicating that the bolts are tightened as the temperature rises from ambient temperature to the operation temperature, thereby providing an improved sealing.

Briefly, selection of materials which satisfy the relationship, [expansion of the bolt]≦[expansion of the cover+expansion of the insulator (α-alumina)+expansion of the outer case flange+expansion of the aluminum packings], enables excellent sealing of the battery to be maintained at high temperature during operation.

In addition to the advantages obtained from the previously described embodiments, sealing of the fourth embodiment further provides the following advantage:

vii) The insulator, which also serves as a cover, eliminates use of a cover. When the cell temperature rises during operation, excellent sealing can be obtained, since metal washers 55 are provided for compensating expansion of bolts 51.

In the above-described fourth embodiment, a sodium secondary battery is constructed by forming a positive electrode chamber inside a one-end-closed, tubular solid electrolyte disposed inside the outer case and a negative electrode chamber outside the solid electrolyte, wherein the insulator also serves as a cover. However, this embodiment may be further modified; a sodium secondary battery having a structure, as described with reference to Embodiment 1, can also be constructed with the exception that the insulator material also serves as a cover.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A sodium secondary battery, comprising:

an outer case having a discrete end member secured thereto and defining an opening portion therein:

a negative electrode chamber defined by a bottom-closed hollow cylindrical solid electrolyte accommodated in the outer case;

a positive electrode chamber formed outside the solid electrolyte, a cover which closes the opening portion being fastened to the end member by bolts; and, an insulator interposed between the end member and the cover; and wherein the cover and the end member are comprised of the same material and the linear coefficient of expansion thereof is greater than that of the insulator.

2. The sodium secondary battery according to claim 1, wherein a space is provided at an opening portion of the outer case to allow expansion of the bolts when the cell temperature rises to the operation temperature of the battery.

3. The sodium secondary battery according to claim 1, wherein a space is provided at the opening portion of the outer case to allow expansion of the bolts when the cell temperature rises to the operation temperature of the battery.

4. A sodium secondary battery, comprising:

an outer case having a discrete end member secured thereto and defining an opening portion therein;

a positive electrode chamber defined by a bottom-closed hollow cylindrical solid electrolyte accommodated in the outer case;

a negative electrode chamber formed outside the solid electrolyte;

an insulator which also serves as a cover located on the opening portion and being fastened to the end member by bolts; and, wherein the end member has a linear coefficient of expansion different from that of the insulator.

5. A sodium secondary battery, comprising a negative electrode chamber;

a positive electrode chamber; and a plate-like solid electrolyte interposed between the negative and positive electrode chambers such that a negative electrode container having an outwardly projecting flange and a positive electrode container having an outwardly projecting flange are placed on opposite sides with respect to the solid electrolyte, wherein an insulator is provided along the periphery of the solid electrolyte, and the flange of the negative electrode container and the flange of the positive electrode chamber are fastened to each other by bolts while interpositioning the insulator between the flanges.

6. The sodium secondary battery according to claim 5, wherein the flanges for the negative and positive electrode container are formed of the same material, and the linear expansion coefficient of the flanges is greater than that of the insulator.

7. The sodium secondary battery according to claim 5, wherein bolt-receiving portions of the flanges have a predetermined thickness so as to compensate for expansion of said bolts when the cell temperature rises to the operation temperature of the battery.

8. A battery, comprising:

an outer case including a discrete end member secured thereto having an opening;

a cylindrical electrolyte defining a first electrode chamber and a second electrode chamber on opposite sides outside thereof;

a cover that closes the opening of said outer case;

an insulator provided between said end member and said cover;

at least one bolt that secures said cover to said end member; and, wherein the cover and the end member are comprised of the same material and the coefficient of expansion thereof is different from that of the insulator.

9. A battery of claim 8, further comprising:

a first packing provided between said cover and said insulator; and a second packing provided between said insulator and said outer case.

10. A battery of claim 9, wherein an amount of expansion of said bolt is smaller than a total amount of expansion of said outer case, said cover, said insulator, and said first and second packings.

11. A battery of claim 8, further comprising:

a packing provided between said cover and said outer case; and a washer provided between said bolt and said cover.

12. A battery of claim 11, wherein an amount of expansion of said bolt is smaller than a total amount of expansion of said outer case, said cover, said insulator, said packing, and said washer.

13. A battery, comprising:

a first container having a first flange portion at a peripheral portion thereof, a second container having a second flange portion at a peripheral portion thereof, said first and second containers defining a chamber therein;

an electrolyte provided inside said chamber, said first container and said electrolyte defining a first electrode chamber, and said second container and said electrolyte defining a second electrode chamber;

an insulator provided between said first and second flange portions; and at least one bolt that secures said first flange portion to said second flange portion.

14. A battery of claim 13, further comprising:

a first packing provided between said first flange portion and said insulator; and a second packing provided between said insulator and said second flange portion.

15. A battery of claim 14, wherein an expansion amount of said bolt is smaller than a total expansion amount of said first flange portion, said second flange portion, said insulator, and said first and second packings.

* * * * *